United States Patent [19]
Gibson

[11] Patent Number: 5,156,326
[45] Date of Patent: Oct. 20, 1992

[54] BRAZING FLUX AND METHOD OF USING THE SAME

[75] Inventor: David Gibson, Redford Township, Wayne County, Mich.

[73] Assignee: Park Metallurgical Corporation, Detroit, Mich.

[21] Appl. No.: 766,761

[22] Filed: Sep. 27, 1991

Related U.S. Application Data

[63] Continuation-in-part of Ser. No. 626,636, Dec. 12, 1990, abandoned.

[51] Int. Cl.$^5$ ............................................... B23K 1/20
[52] U.S. Cl. ............................... 228/223; 228/263.17; 148/26
[58] Field of Search ................... 228/223, 224, 263.17; 148/24, 23, 26

[56] References Cited

U.S. PATENT DOCUMENTS

| | | | |
|---|---|---|---|
| 2,171,041 | 8/1939 | Michel | 228/223 |
| 2,686,354 | 8/1954 | Lundin | 228/223 X |
| 2,909,643 | 10/1959 | Graves | 228/224 X |
| 3,001,277 | 9/1961 | Giovannucci | 228/223 X |
| 3,192,076 | 6/1965 | Ballass | 148/26 |
| 3,432,910 | 3/1969 | Bottum | 228/184 X |
| 3,580,748 | 5/1971 | Delong | 148/26 |
| 3,620,716 | 11/1971 | Hess | 75/685 |
| 3,951,328 | 4/1976 | Wallace | 228/223 X |
| 3,971,501 | 7/1976 | Cooke | 228/248 |
| 4,428,920 | 1/1984 | Willenberg | 423/465 |
| 4,579,605 | 4/1986 | Kawase | 148/26 |
| 4,619,716 | 10/1986 | Suzuki | 228/223 X |
| 4,723,597 | 2/1988 | Sonoda | 148/26 |
| 4,901,909 | 2/1990 | George | 228/223 |
| 4,906,307 | 3/1990 | Fujiyoshi | 228/263.17 X |

FOREIGN PATENT DOCUMENTS 1055914 3/1964 United Kingdom .

OTHER PUBLICATIONS

W. E. Cooke et al., "Furnace Brazing of Aluminum with a Non-Corrosive Flux", Society of Automotive Engineers, 1978.
Pat. Abs. of Japan, Takahashi, 01-293993, Feb. 1990.
Pat. Abs. of Japan, Furuta, 60-37294, Jul. 1985.
Pat. Abs. of Japan, Itou, 61-9995, Jun. 1986.
Pat. Abs. of Japan, Tanabe, 60-87996, Sep. 1985.
Pat. Abs. of Japan, Yamaguchi, 60-202940, Aug. 1987.

*Primary Examiner*—Richard K. Seidel
*Assistant Examiner*—Patty E. Hong
*Attorney, Agent, or Firm*—Renner, Otto, Boisselle & Sklar

[57] ABSTRACT

The invention provides a brazing flux for brazing metal and a method of using the same. More particularly, the invention provides a brazing flux for use in joining pieces of aluminum or aluminum alloys. The brazing flux comprises from about 62 percent by weight to about 74 percent by weight hydrated potassium cryolite and from about 26 percent by weight to about 38 percent by weight $AlF_3$. The hydrated potassium cryolite comprises $K_3AlF_6$ and $K_2AlF_5 \cdot H_2O$. Preferably, the brazing flux is substantially free of $KAlF_4$ and unreacted KF. More particularly, the brazing flux contains no $KAlF_4$ and no unreacted KF. The brazing flux is capable of displaying a melting temperature as low as 560° C. (1040° F.).

23 Claims, No Drawings

BRAZING FLUX AND METHOD OF USING THE SAME

RELATED APPLICATIONS

This application is a continuation-in-part of application Ser. No. 07/626,636 filed Dec. 12, 1990 also entitled Brazing Flux And Method Of Using The Same, now abandoned.

TECHNICAL DISCLOSURE

This invention concerns a flux for use in joining two or more pieces of metal. More particularly, the invention concerns a new and improved potassium fluoroaluminate flux which is particularly well suited for use in joining two or more pieces of aluminum.

BACKGROUND

Fluxes have been used for many years to prevent the formation of, or to dissolve and facilitate removal of, oxides and other undesirable substances during the brazing of metals. As used herein this specification and the claims below, the term "brazing" generally means a group of welding processes that join solid materials together by heating them to a suitable temperature and using a filler metal having a liquidus above about 450° C. (840° F.) and below the solidus of the base materials being joined.

During the brazing process filler metal is distributed between the closely fitted surfaces of the pieces being joined by capillary attraction. More particularly, with respect to aluminum it is well-known to join two or more pieces of aluminum by disposing an aluminum brazing alloy between or adjacent the faying surfaces of the aluminum pieces being joined and heating the brazing alloy and the faying surfaces to a temperature at which the brazing alloy melts while the aluminum pieces remain unmelted As used herein this specification and the claims below the term "faying surfaces" means the surfaces of the pieces of metal that are in close proximity or contact and are to be joined Upon subsequent cooling, the brazing alloy forms a fillet or joint that bonds the faying surfaces together It is generally preferred that the melting point of the brazing alloy be at least about 30° C. to 40° C. (86° F. to 104° F.) lower than that of the metal of the components being joined Examples of suitable aluminum brazing alloys are alloys which contain aluminum and silicon and have a melting temperature of about 577° C. (1070° F.)

In some applications, one or both of the faying surfaces may be preclad with a layer of aluminum brazing alloy. In other applications, however, the brazing alloy is applied to the faying surfaces in the form of a powdered or particulate mixture carried in a suitable liquid or paste-like vehicle. Although fluxless brazing procedures have been devised, their use in many applications is not preferred. Thus, in many applications it is necessary to employ a flux while brazing aluminum The flux serves to remove the oxide ordinarily present on the faying surfaces, promote flow of molten brazing alloy during the heating step and inhibit further oxide formation. Fluxes are generally reactive when they are in the molten or liquid state. Thus, a flux must be partly or wholly molten at aluminum brazing temperatures in order to allow the flux to properly perform. Aluminum brazing temperatures are generally above about 571° C. (1060° F.)

Wallace et al. U.S. Pat. No. 3,951,328 and Cooke U.S. Pat. No. 3,971,501 both disclose the use of potassium fluoroaluminate complexes in fluxes for brazing aluminum Both Wallace et al. and Cooke define potassium fluoroaluminate complexes to include $AlF_3$, $KAlF_4$ and $K_3AlF_6$. In both Wallace et al. and Cooke the preferred formulation of the flux comprises an intimate mixture of $K_3AlF_6$ and $KAlF_4$. The assignee of the Wallace et al. and Cooke patents, (i.e., Alcan Research and Development Limited of Montreal, Canada) markets a brazing flux relating to the Wallace et al. and Cooke patents under the registered trademark NOCOLOK. To the best of applicant's knowledge the NOCOLOK brazing flux comprises approximately 90 percent by weight $KAlF_4$ and about 10 percent by weight $K_3AlF_6$. The NOCOLOK brazing flux exhibits a melting temperature of approximately 560° C. (1040° F.). As used herein this specification and the claims below the term "melting temperature" means the temperature at which substantially the entire portion of a compound or a material changes from a solid to a liquid within a period of less than about one (1) minute.

The prior art brazing fluxes have been found to be acceptable for various aluminum brazing applications. However, in some applications the prior art brazing fluxes have left a two salt residue which is not always desirable Also, the prior art brazing fluxes have been known to emit gases which in some applications have required pollution abatement equipment in order to properly handle and/or process the evolving gases.

SUMMARY OF THE INVENTION

The present invention provides a new and improved brazing flux and method of using the same for joining two or more pieces of metal. The brazing flux is particularly well adapted for use with aluminum and provides several distinct advantages More particularly, a brazing flux made in accordance with the principles of the present invention is capable of melting at temperatures as low as 560° C. (1040° F.) Such brazing fluxes also provide a distinct advantage in that in many applications only a single salt residue is produced subsequent to brazing Furthermore, the brazing flux of the present invention has been found in many applications to produce fewer noxious evolving gases.

The brazing flux comprises a mixture of hydrated potassium cryolite and $AlF_3$ and is substantially free of $KAlF_4$ substantially free of any unreacted KF. As used herein this specification and the claims below the term "substantially free" means less than 1 percent by weight. Preferably, the brazing flux contains no $KAlF_4$ and no KF. The hydrated potassium cryolite comprises $K_3AlF_6$ and $K_2AlF_5.H_2$). More particularly, the brazing flux comprises from about 62 percent by weight to about 74 percent by weight hydrated potassium cryolite and from about 26 percent by weight to about 38 percent by weight $AlF_3$. Preferably, the flux comprises from about 68 percent by weight to about 71 percent by weight hydrated potassium cryolite and from about 29 percent by weight to about 35 percent by weight $AlF_3$. More preferably, the flux comprises about 68 percent by weight hydrated potassium cryolite and about 32 percent by weight $AlF_3$.

The hydrated potassium cryolite may comprise up to about 25 percent by weight $K_2AlF_5.H_2O$ and at least about 75 percent by weight $K_3AlF_6$. Preferably, the hydrated potassium cryolite comprises from about 17 percent by weight to about 22 percent by weight $K_2AlF_5 \cdot H_2O$ and from about 78 percent by weight to about 83 percent by weight $K_3AlF_6$. More preferably, the hydrated potassium cryolite comprises about 20 percent by weight $K_2AlF_5 \cdot H_2O$ and about 80 percent by weight $K_3AlF_6$.

The foregoing and other features of the invention are hereinafter more fully described and particularly pointed out in the claims. The following description setting forth in detail certain illustrative embodiments of the invention, these being indicative, however, of but a few of the various ways in the which principles of the present invention may be employed.

DETAILED DESCRIPTION

A brazing flux made in accordance with the present invention comprises a mixture of hydrated potassium cryolite and $AlF_3$ and is substantially free of $KAlF_4$ and substantially free of unreacted KF. Preferably, the brazing flux contains no $KAlF_4$ and no unreacted KF. More particularly, the flux comprises from about 62 percent by weight to about 74 percent by weight hydrated potassium cryolite and from about 26 percent by weight to about 38 percent by weight $AlF_3$. Preferably, the flux comprises from about 65 percent by weight to about 71 percent by weight hydrated potassium cryolite and from about 29 percent by weight to about 35 percent by weight $AlF_3$. More preferably, the flux comprises about 68 percent by weight hydrated potassium cryolite and about 32 percent by weight $AlF_3$.

The hydrated potassium cryolite may comprise up to about 25 percent by weight $K_2AlF_5 \cdot H_2O$ and at least about 75 percent by weight $K_3AlF_6$. Preferably, the hydrated potassium cryolite comprises from about 17 percent by weight to about 22 percent by weight $K_2AlF_5 \cdot H_2O$ and from about 78 percent by weight to about 83 percent by weight $K_3AlF_6$. More preferably, the hydrated potassium cryolite comprises about 20 percent by weight $K_2AlF_5 \cdot H_2O$ and about 80 percent by weight $K_3AlF_6$.

The brazing flux is capable of displaying a melting temperature as low as about 560° C. (1040° F.). More particularly, when the flux comprises about 68 percent by weight hydrated potassium cryolite and about 32 percent by weight $AlF_3$ it displays a melting temperature as low as about 560° C. (1040° F.).

The brazing flux may be produced by various means as disclosed in Cooke U.S. Pat. No. 3,971,501 and Wallace et al. U.S. Pat. No. 3,951,328. The disclosure of the Wallace et al. U.S. Pat. No. 3,951,328 and the disclosure of the Cooke U.S. Pat. No. 3,971,501 are incorporated herein by reference and particularly for their disclosures on how to prepare the chemical components of a brazing flux and how to utilize a brazing flux.

The brazing flux is preferably produced by mixing previously prepared hydrated potassium cryolite and $AlF_3$ in the desired amounts. An example of a suitable source of the $AlF_3$ is $AlF_3$ sold under the name "aluminum fluoride" by Alcoa Industrial Chemicals Division of Bauxite, Ark. 72011. An example of a suitable source of the hydrated potassium cryolite is hydrated potassium cryolite sold under the name "potassium cryolite" by the Kali Chemie Corporation of 41 W. Putnam Avenue, Greenwich, Conn. 06830. The hydrated potassium cryolite which is available from Kali Chemie Corporation generally displays a composition of about 20 percent by weight $K_2AlF_5 \cdot H_2O$ and about 80 percent by weight $K_3AlF_6$. One distinct advantage the hydrated potassium cryolite exhibits over non-hydrated forms of potassium cryolite is that the hydrated potassium cryolite is generally available at a lower cost.

The $AlF_3$ and hydrated potassium cryolite each have an average particle size of less than about 100 mesh, preferably an average particle size of less than about 200 mesh, and more preferably an average particle size of about 325 mesh.

When the brazing flux is to be utilized by an end user who is joining preclad aluminum surfaces, the brazing flux may be provided to the end user in dry form (i.e., a dry mixture of hydrated potassium cryolite and $AlF_3$). Such an end user may then mix the dry brazing flux with a suitable liquid carrier to produce a slurry which facilitates the application of the brazing flux to the preclad faying surfaces An example of a cladding material suitable for use with the present invention is cladding sheet sold under the designation BALSI-5 or 4045 by the Alcoa Sheet and Plate Division of Bettendorf, Iowa 52722. Alternatively, when an end user is joining aluminum pieces that are not preclad, a brazing alloy is preferably mixed with the brazing flux, a liquid carrier and a binder so as to form a paste.

Various binders and/or liquid carriers may be utilized to form a paste or slurry. Examples of suitable binders for use in producing a paste are ethylcellulose, oleic acid, polyvinyl butyral, or an acrylate resin (e.g., methyl methacrylate). Examples of suitable liquid carriers for use in producing a paste or a slurry are ethers such as diethylene glycol monobutyl ether; esters of polyhydrine alcohols such as 2,4,4-trimethyl-1,3-pentanediol monoisobutyrate; N-methyl-2-pyrrolidone; aliphatic alcohols, and esters of such alcohols, for example, the acetates and propionates; terpenes such a pine oil and terpineol; solutions of resins such as the polymethacrylates of lower alcohols; the monobutyl ether of ethylene glycol monoacetate, or butyl carbitol acetate.

When the brazing flux is utilized as a slurry the slurry comprises from about 10 percent by weight to about 18 percent by weight brazing flux and from about 82 percent by weight to about 90 percent by weight liquid carrier Preferably, the slurry comprises about 15 percent by weight brazing flux and about 85 percent by weight liquid carrier and the liquid carrier preferably comprises deionized water ($H_2O$).

When a paste is to be produced the paste preferably comprises from about 30 percent by weight to about 35 percent by weight brazing flux, from about 5 percent by weight to about 15 percent by weight liquid carrier, from about 5 percent by weight to about 10 percent by weight binder and from about 40 percent by weight to about 55 percent by weight brazing alloy powder. More preferably, the paste comprises about 32 percent by weight brazing flux, about 10 percent by weight liquid carrier, about 8 percent by weight binder and about 50 percent by weight brazing alloy powder. The liquid carrier preferably comprises water and the binder preferably comprises oleic acid. The powdered brazing alloy preferably has an average particle size of about 100 mesh, preferably an average particle size of less than about 200 mesh, and more preferably an average particle size of about 325 mesh. The brazing alloy powder comprises aluminum. Preferably, the brazing alloy powder comprises aluminum and silicon. An example of a brazing alloy powder suitable for use with the present invention is an aluminum silicate alloy brazing powder sold under the designation BALSI-5 or 4045 by the Alcoa Powder Division of Rockdale, Tex. 76567.

Once the brazing flux in the form of a dry powder, slurry or paste has been prepared it may then be applied to the pieces of aluminum or aluminum alloy to be joined along the faying surfaces of such pieces. The brazing flux may be applied by various means including, for example, dipping, electrostatic deposition spraying or brushing Of course, the particular application technique employed will be a function of the configuration of the aluminum or aluminum alloy pieces being joined, the form in which the brazing alloy is supplied (i.e., powder, paste or slurry) and other variables. After application of the brazing flux the pieces are then properly positioned and heated to a temperature of from about 571° C. (1060° F.) to about 610° C. (1130° F.), and preferably from about 588° C. (1090° F.) to about 607° C. (1125° F.), and then cooled to room temperature. A connective joint is formed between the pieces of aluminum on cooling. Preferably, only a single salt residue is produced during heating by the brazing flux. This single salt residue preferably comprises $KAlF_4$.

Preferably, the brazing flux is utilized as a slurry on preclad surfaces and the liquid carrier comprises deionized water ($H_2O$). A suitable cladding material is BAL-SI-5 or 4045 cladding sheet. The slurry should comprise about 15 percent by weight brazing flux and about 85 percent by weight water. The brazing flux should comprise about 68 percent by weight hydrated potassium cryolite and about 32 percent by weight $AlF_3$ and it should be substantially free of $KAlF_4$ and substantially free of unreacted KF. The hydrated potassium cryolite should comprise about 20 percent by weight $K_2AlF_5 \cdot H_2O$ and about 80 percent by weight $K_3AlF_6$. The average particle size of both the $K_3AlF_6$ and the $AlF_3$ should be about 325 mesh. Once the slurry has been mixed it may then be applied to the faying surfaces of the preclad aluminum or aluminum alloy pieces with a spray applicator The pieces are then properly positioned and heated to a temperature of about 604° C. (1120° F.) The pieces are then cooled to room temperature with a connective joint forming between the pieces during cooling.

Although the invention has been shown and described with respect to certain preferred embodiments, it is obvious that equivalent alterations and modifications will occur to others skilled in the art upon their reading and understanding of the specification. The present invention includes all such equivalent alterations and modifications and is limited only by the scope of the following claims.

What is claimed:

1. A brazing flux for brazing metal comprising from about 62 percent by weight to about 74 percent by weight hydrated potassium cryolite and from about 26 percent by weight to about 38 percent by weight $AlF_3$, said hydrated potassium cryolite comprising $K_3AlF_6$ and $K_2AlF_5 \cdot H_2O$, said brazing flux being substantially free of $KAlF_4$ and substantially free of unreacted KF.

2. A brazing flux as set forth in claim 1 comprising from about 65 percent by weight to about 71 percent by weight said hydrated potassium cryolite and from about 29 percent by weight to about 35 percent by weight said $AlF_3$.

3. A brazing flux as set forth in claim 1 comprising about 68 percent by weight said hydrated potassium cryolite and about 32 percent by weight $AlF_3$.

4. A brazing flux as set forth in claim wherein said hydrated potassium cryolite comprises up to about 25 percent by weight $K_2AlF_5 \cdot H_2O$ and at least about 75 percent by weight $K_3AlF_6$.

5. A brazing flux as set forth in claim 1 wherein said hydrated potassium cryolite comprises from about 17 percent by weight to about 22 percent by weight $K_2AlF_5 \cdot H_2O$ and from about 78 percent by weight to about 83 percent by weight $K_3AlF_6$.

6. A brazing flux as set forth in claim wherein said hydrated potassium cryolite comprises about 20 percent by weight $K_2AlF_5 \cdot H_2O$ and about 80 percent by weight $K_3AlF_6$.

7. A paste for use in brazing metal comprising:
   (A) a brazing alloy;
   (B) a brazing flux comprising from about 62 percent by weight to about 74 percent by weight hydrated potassium cryolite and from about 26 percent by weight to about 38 percent by weight $AlF_3$, said hydrated potassium cryolite comprising $K_3AlF_6$ and $K_2AlF_5 \cdot H_2O$, said brazing flux being substantially free of $KAlF_4$ and substantially free of unreacted KF.

8. A paste as set forth in claim 7 wherein said brazing alloy comprises aluminum.

9. A paste as set forth in claim 8 including a liquid carrier and a binder.

10. A paste as set forth in claim 9 wherein said liquid carrier comprises water and said binder comprises oleic acid.

11. A paste as set forth in claim 7 wherein said brazing flux comprises about 68 percent by weight hydrated potassium cryolite and about 32 percent by weight said $AlF_3$, and said hydrated potassium cryolite comprises at least about 75 percent by weight $K_3AlF_6$ and up to about 25 percent by weight $K_2AlF_5 \cdot H_2O$.

12. A method of joining two or more pieces of metal comprising the steps of:
   (A) providing a composition including a brazing flux, such brazing flux comprising from about 62 percent by weight to about 74 percent by weight hydrated potassium cryolite and from about 26 percent by weight to about 38 percent by weight $AlF_3$, such hydrated potassium cryolite comprising $K_3AlF_6$ and $K_2AlF_5 \cdot H_2O$, such brazing flux being substantially free of $KAlF_4$ and substantially free of unreacted KF;
   (B) applying the composition to such pieces being joined; and
   (C) heating such pieces to a suitable brazing temperature.

13. A method of joining as set forth in claim 12 wherein during said step (A) such brazing flux is mixed with a liquid carrier such that such composition forms a slurry.

14. A method of joining as set forth in claim 12 wherein during said step (C) such pieces are heated to a temperature of from about 571° C. to about 610° C.

15. A method of joining as set forth in claim 12 wherein during said step (C) such pieces are heated to a temperature of from about 588° C. to about 607° C.

16. A method of joining as set forth in claim 12 wherein at least one of such metal pieces comprises an aluminum alloy having a melting temperature which is greater than that of such brazing flux.

17. A method of joining as set forth in claim 13 wherein such composition includes a brazing alloy and such brazing alloy comprises aluminum.

18. A method of joining as set forth in claim 17 wherein such brazing alloy comprises aluminum and silicon and subsequent to said step (C) a residue is formed by such composition, such residue consisting essentially of a single salt.

19. A method of joining as set forth in claim 18 wherein such single salt comprises $KAlF_3$ and such liquid carrier comprises water.

20. A method of joining as set forth in claim 13 including the step of drying said composition after said step (B) whereby at least a portion of such liquid carrier is removed from such composition.

21. A method of joining as set forth in claim 13 including the step of cooling such metal pieces subsequent to said step (C) whereby a connective joint is formed between such metal pieces.

22. A slurry for use in brazing together two or more pieces of aluminum or aluminum alloys comprising:
 a liquid carrier; and
 a brazing flux, said brazing flux comprising from about 62 percent by weight to about 74 percent by weight hydrated potassium cryolite and from about 26 percent by weight to about 38 percent by weight $AlF_3$, said hydrated potassium cryolite consisting of $K_3AlF_6$ and $K_2AlF_5.H_2O$, said brazing flux being substantially free of $KAlF_4$ and substantially free of unreacted KF.

23. A slurry as set forth in claim 22 comprising from about 10 percent by weight to about 18 percent by weight brazing flux and from about 82 percent by weight to about 90 percent by weight liquid carrier, said liquid carrier comprising water.

* * * * *